(12) United States Patent
Asano (10) Patent No.: US 12,549,674 B2
(45) Date of Patent: Feb. 10, 2026

(54) OPTICAL APPARATUS

(71) Applicant: FUJIFILM Business Innovation Corp., Tokyo (JP)

(72) Inventor: Motohiro Asano, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 399 days.

(21) Appl. No.: 18/163,001

(22) Filed: Feb. 1, 2023

(65) Prior Publication Data

US 2024/0089387 A1 Mar. 14, 2024

(30) Foreign Application Priority Data

Sep. 9, 2022 (JP) ................. 2022-143483

(51) Int. Cl.
*H04N 1/00* (2006.01)
*H04N 1/401* (2006.01)

(52) U.S. Cl.
CPC ..... *H04N 1/00798* (2013.01); *H04N 1/00652* (2013.01); *H04N 1/401* (2013.01)

(58) Field of Classification Search
CPC . H04N 1/00798; H04N 1/00652; H04N 1/401
See application file for complete search history.

(56) References Cited

U.S. PATENT DOCUMENTS 4,831,458 A * 5/1989 Watanabe ................ H04N 1/40
358/443
2018/0302530 A1* 10/2018 Inui ..................... H04N 1/40056

FOREIGN PATENT DOCUMENTS

JP 2003-078713 A 3/2003
JP 2006-020084 A 1/2006

* cited by examiner

*Primary Examiner* — Ibrahim Siddo
(74) *Attorney, Agent, or Firm* — Oliff PLC

(57) ABSTRACT

An optical apparatus includes a reader having a contact optical system including an image sensor configured to read light condensed by lenses after passing along light shields each disposed between the lenses, and a fixed member fixed to a position where the fixed member faces the reader and partially or entirely having a white part. The reader is configured to perform reading by adjusting a focus onto an image on a document passing across a position closer to the reader than is the fixed member, and perform reading by adjusting the focus onto the white part of the fixed member.

8 Claims, 7 Drawing Sheets

OPTICAL APPARATUS

CROSS-REFERENCE TO RELATED APPLICATIONS

This application is based on and claims priority under 35 USC 119 from Japanese Patent Application No. 2022-143483 filed Sep. 9, 2022.

BACKGROUND

(i) Technical Field

The present disclosure relates to an optical apparatus.

(ii) Related Art

There is known a technology in which a reader reads images on documents (e.g., Japanese Unexamined Patent Application Publication No. 2006-20084). In this technology, the reader performs a process of reading a document and a process of reading shading data for shading correction in which lens aberration and uneven illumination are corrected. The shading data reading process is not only performed before the start of the document reading process but is also performed successively after the start of the document reading process to keep the reading quality.

SUMMARY

Aspects of non-limiting embodiments of the present disclosure relate to the following circumstances. The shading data reading process is performed by reading a white correction plate disposed at a position different from the position of the document reading process. Therefore, the reader moves every time the shading correction is performed. As a result, the reader movement period required to read the shading data may hinder an attempt to increase the speed of the document reading process or to read many documents within a short period.

Aspects of non-limiting embodiments of the present disclosure therefore relate to reduction in the period required to acquire the shading data for the shading correction compared with the case where the reader moves every time the reader acquires the shading data.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an optical apparatus comprising: a reader having a contact optical system comprising an image sensor configured to read light condensed by lenses after passing along light shields each disposed between the lenses; and a fixed member fixed to a position where the fixed member faces the reader and partially or entirely having a white part, wherein the reader is configured to perform reading by adjusting a focus onto an image on a document passing across a position closer to the reader than is the fixed member, and perform reading by adjusting the focus onto the white part of the fixed member.

BRIEF DESCRIPTION OF THE DRAWINGS

An exemplary embodiment of the present disclosure will be described in detail based on the following figures, wherein.

DETAILED DESCRIPTION

An exemplary embodiment of the present disclosure is described in detail with reference to the accompanying drawings.

(Related-Art Shading Correction)

Figure 1A:
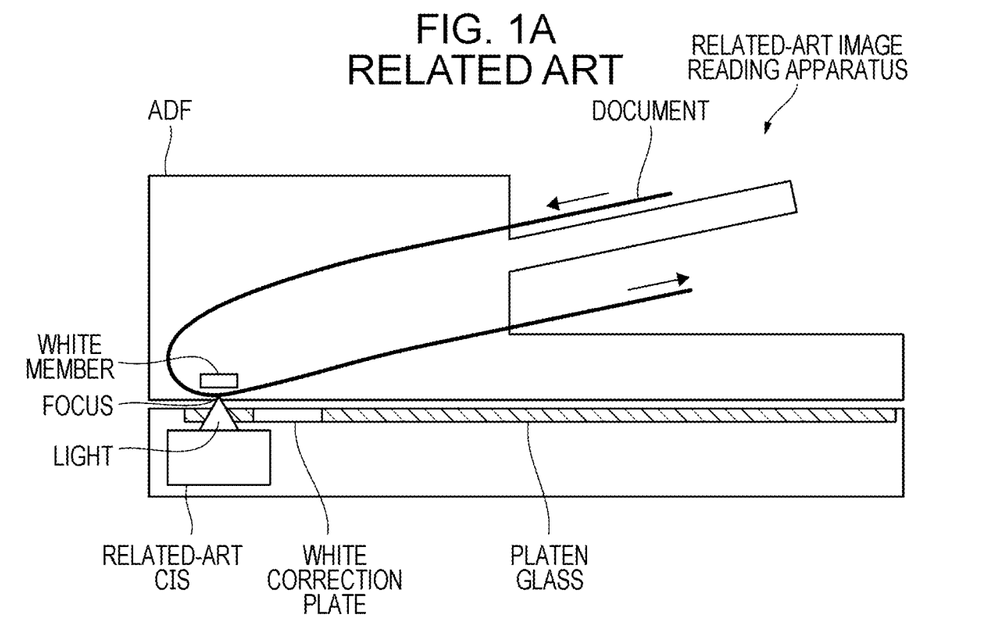
FIGS. 1A and 1B illustrate the overall structure of a related-art image reading apparatus and shading correction to be performed by the related-art image reading apparatus.
Figure 1B:
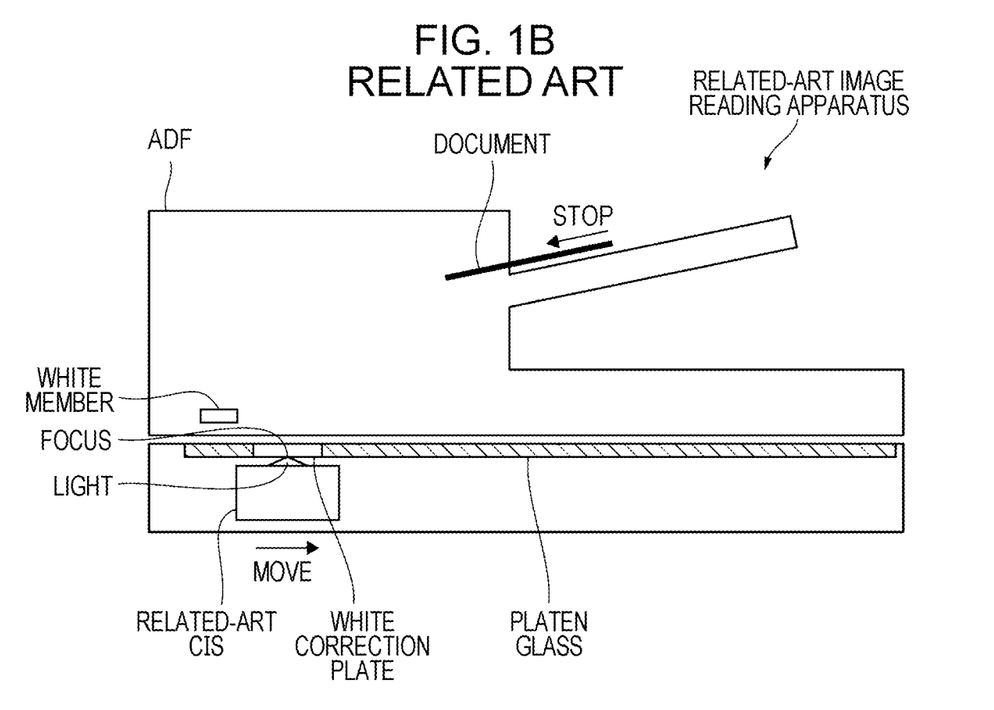

FIGS. 1A and 1B illustrate the overall structure of a related-art image reading apparatus and shading correction to be performed by the related-art image reading apparatus.

Figure 2A:
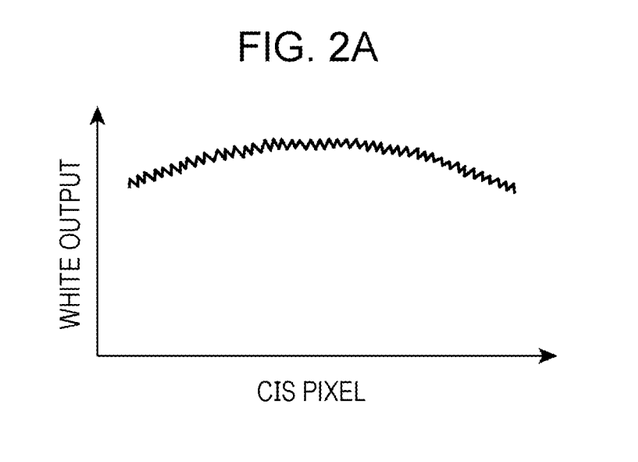
FIGS. 2A and 2B are graphs illustrating white output values before and after the shading correction.
Figure 2B:
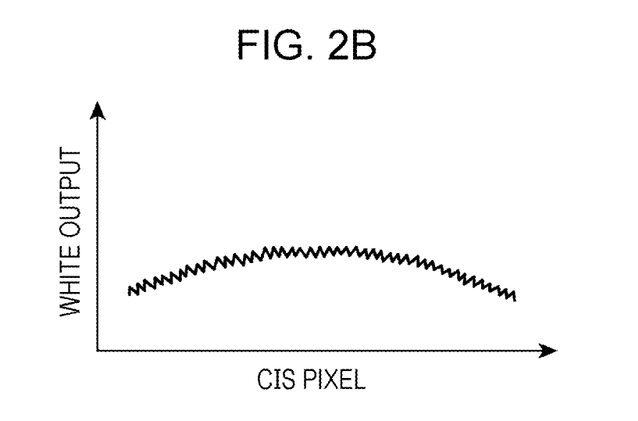

FIGS. 2A and 2B are graphs illustrating white output values before and after the shading correction.

FIGS. 1A and 1B are sectional views of the related-art image reading apparatus. The related-art image reading apparatus automatically and successively performs a process in which an automatic document feeder (ADF) feeds a document to a document platen and a process in which a contact image sensor (CIS) reads an image on the document fed to the document platen. The CIS of the related-art image reading apparatus is a light-emitting device including light sources, lenses, and light receiving elements as a unit, and is an image sensor having a contact optical system that constitutes the image reading apparatus. When the CIS performs document reading, shading correction is performed at a predetermined timing before the start of the document reading. The shading correction is a process to be started in response to acquisition of shading data.

When the shading correction is performed before the start of the document reading process of the CIS, the white output value of each CIS pixel increases as illustrated in FIG. 2A. If the document reading process of the CIS is then started and lens unevenness occurs but the lens unevenness is minute as illustrated in FIG. 2B, the non-uniformity of output characteristics in a main scanning direction is canceled and the output characteristics are made uniform by division using shading data acquired before the start of the document reading process.

If the document reading process of the CIS proceeds and individual differences occur in the output characteristics in the main scanning direction due to influence of, for example, a decrease in light intensity or a change in temperature or moisture absorption, the non-uniformity of the output characteristics in the main scanning direction is not sufficiently canceled with the shading data acquired before the start of the document reading process. Therefore, the shading correction is performed successively at predetermined timings to deal with the change in characteristics of the lenses constituting the CIS. For example, the shading correction is performed once every time the CIS has read 10 documents.

Figure 3A:
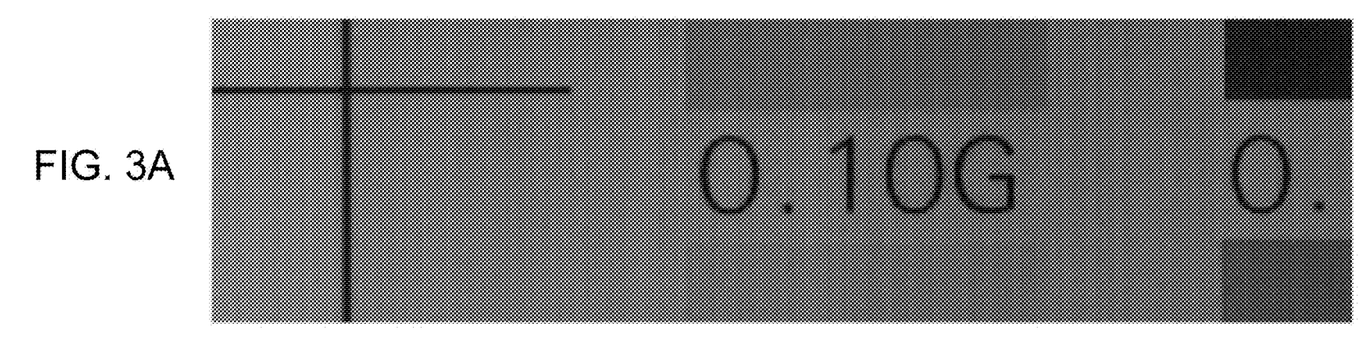
FIG. 3A illustrates a specific example of an output image before the shading correction.
Figure 3B:
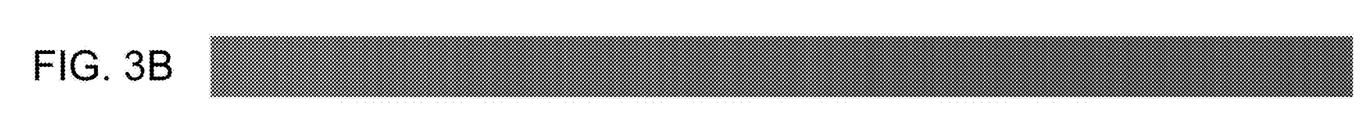
FIG. 3B illustrates a specific example of shading data.
Figure 3C:
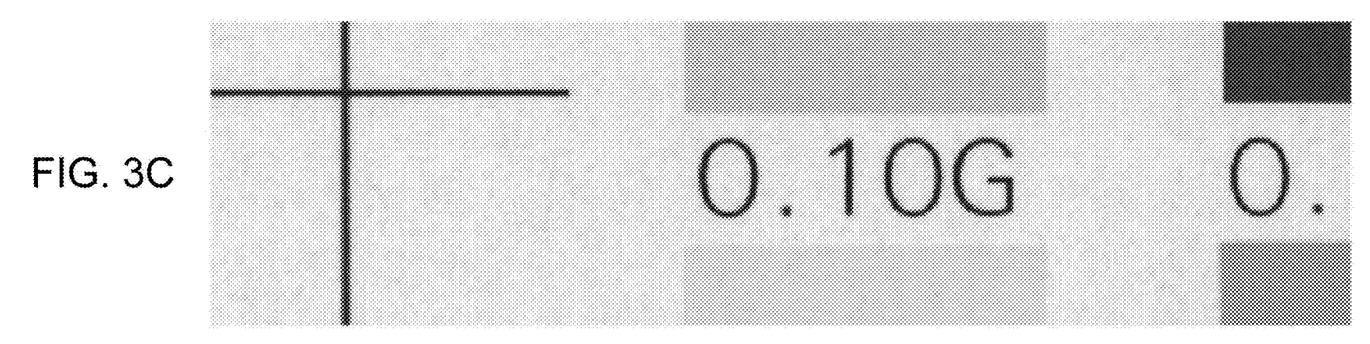
FIG. 3C illustrates a specific example of the output image after the shading correction.

FIGS. 3A to 3C illustrate a specific example of an output image that undergoes the shading correction so that the non-uniformity of the output characteristics in the main scanning direction is canceled and the output characteristics are made uniform.

FIG. 3A illustrates a specific example of the output image before the shading correction. FIG. 3B illustrates a specific example of the shading data. FIG. 3C illustrates a specific example of the output image after the shading correction.

As illustrated in FIG. 3A, the output image before the shading correction is entirely dark because the output characteristics in the main scanning direction have non-uniformity and the white output values are low. To achieve uniformity in the output image by the shading correction, a uniformly white correction plate is read and output characteristics in the main scanning direction are stored as shading data as illustrated in FIG. 3B. When a document is read afterwards, an output image having uniformity by division using the output characteristics of the shading data for the individual lines is output as the output image after the shading correction in FIG. 3C. The shading correction is a process assuming that the characteristics of the output image are not changed, and is represented by an expression "output image before shading correction"÷"output characteristics (shading data)"×constant="output image after shading correction".

In the related-art shading correction to be performed after the start of the document reading, the CIS acquires the shading data by moving from the document reading position (e.g., the position illustrated in FIG. 1A) to the position where the white correction plate is disposed (e.g., the position illustrated in FIG. 1B) and reading the white correction plate. The white correction plate is disposed at a position where the white correction plate is not soiled with ink or the like. In response to the finish of the shading correction, the CIS returns to the original document reading position and resumes the document reading. In this manner, the related-art shading correction involves the movement of the CIS, and therefore the document feeding of the ADF is temporarily stopped at the timing to perform the shading correction as illustrated in FIG. 1B.

(Image Reading Apparatus of Exemplary Embodiment)

Referring to FIGS. 4 to 7D, description is made about an image reading apparatus 1 serving as an optical apparatus according to this exemplary embodiment and shading correction to be performed by the image reading apparatus 1.

Figure 4:
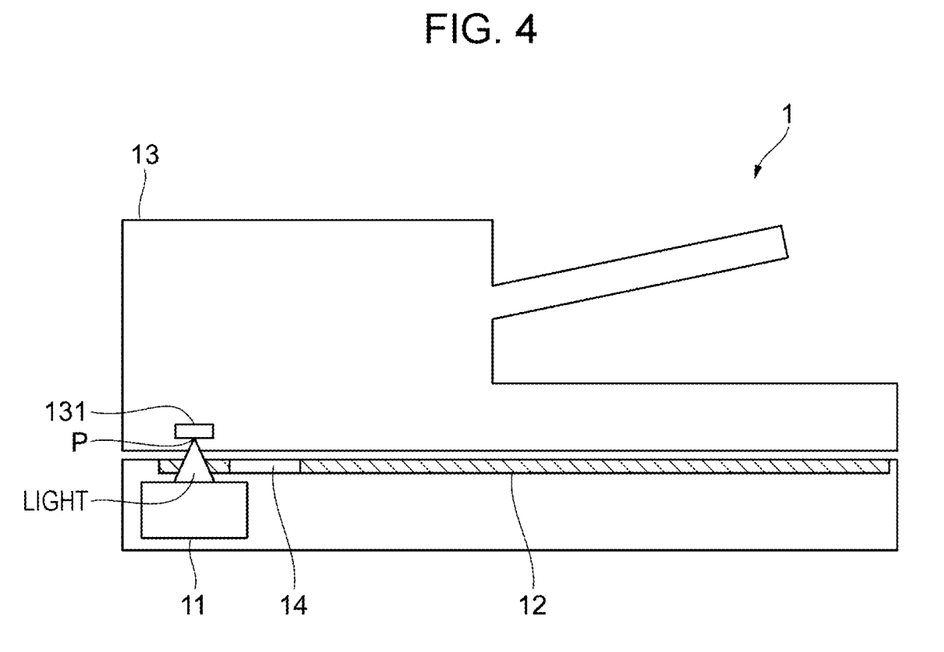
FIG. 4 illustrates an example of the overall structure of an image reading apparatus serving as an optical apparatus according to an exemplary embodiment and an example of shading correction to be performed by the image reading apparatus.

FIG. 4 illustrates an example of the overall structure of the image reading apparatus 1 serving as the optical apparatus according to this exemplary embodiment and an example of the shading correction to be performed by the image reading apparatus 1.

As illustrated in FIG. 4, the image reading apparatus 1 includes a CIS 11, a platen glass 12, an ADF 13, and a white correction plate 14.

The CIS 11 is a contact image sensor having a contact optical system including an image sensor that reads light condensed by lenses (e.g., microlenses 114a described later with reference to FIG. 6) after passing along light shields (e.g., light shields 115b described later with reference to FIG. 6) each disposed between the lenses. The CIS 11 performs the reading by adjusting a focus onto an image on a document passing across a position closer to the CIS 11 than is a white member 131 described later. Specifically, the CIS 11 reads an image on a document fed to a reading position on the platen glass 12 described later similarly to the related-art image reading apparatus illustrated in FIG. 1A.

The CIS 11 also functions as a corrector that performs shading correction. The CIS 11 reads shading data for the shading correction. Specifically, the CIS 11 performs the reading by adjusting the focus onto a white part of the white member 131. Details of the structure of the CIS 11 are described later with reference to FIGS. 5 and 6.

The platen glass 12 is a document platen that supports, on its top surface, a document to be read by the CIS 11.

The ADF 13 is an automatic document feeder that feeds a document to the reading position on the platen glass 12. The ADF 13 includes the white member 131 serving as a fixed member that is made of a resin or the like and partially or entirely has the white part. The white member 131 is fixed to a position where the white member 131 faces the CIS 11 similarly to a white member of the related-art image reading apparatus illustrated in FIG. 1A. The CIS 11 reads the document fed by the ADF 13 when the document passes across a straight line connecting the white member 131 and the CIS 11. At this time, the white member 131 functions to prevent printing in black at a part corresponding to the outside of the outer edge of the document.

When the CIS 11 reads the white member 131, the ADF 13 functions as a document feeding controller that performs control to change the document feeding speed. Examples of the control of the ADF 13 to change the document feeding speed include control to reduce the document feeding speed.

The white correction plate 14 is a white member to be used to acquire shading data by the CIS for the shading correction to be performed before the start of the document reading.

(Shading Correction for Image Reading Apparatus of Exemplary Embodiment)

The image reading apparatus 1 according to this exemplary embodiment performs the shading correction at predetermined timings because lens unevenness may occur similarly to the related-art image reading apparatus described above. Specifically, the shading correction is performed at a predetermined timing before the start of the document reading and at a predetermined timing after the start of the document reading.

In the shading correction to be performed by the image reading apparatus 1 at the predetermined timing before the start of the document reading, the CIS acquires the shading data by moving from the document reading position to the position where the white correction plate is disposed and reading the white correction plate 14 similarly to the related-art image reading apparatus illustrated in FIG. 1B.

In the shading correction to be performed by the image reading apparatus 1 at the predetermined timing after the start of the document reading, the CIS 11 does not move like the case of the related-art image reading apparatus. As illustrated in FIG. 4, the image reading apparatus 1 performs the shading correction by using the white member 131 without moving the CIS 11 from the document reading position.

As illustrated in FIG. 1A, the CIS of the related-art image reading apparatus performs reading by adjusting the focus onto a document passing across the reading position, but a focus P is not adjustable onto the white member disposed more deeply than the passing document due to a small focal depth. Therefore, the white member fixed to the ADF is not usable for the shading correction and the CIS moves to the white correction plate. The CIS 11 of the image reading apparatus 1 according to this exemplary embodiment has a large focal depth as described later with reference to FIGS. 5 and 6, and may therefore acquire the shading data by adjusting the focus P onto the white member 131 fixed to the ADF 13.

Figure 5:
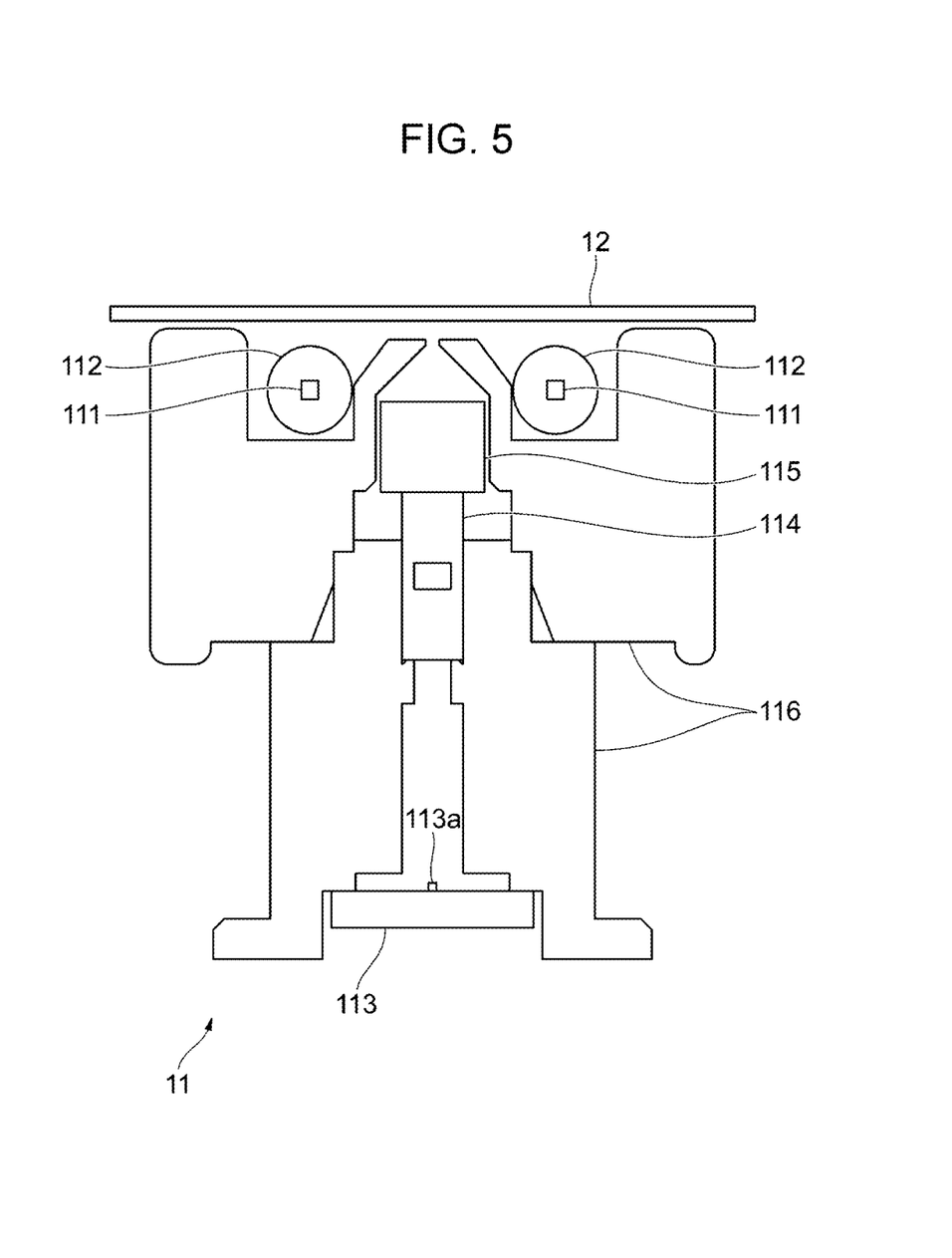
FIG. 5 illustrates an example of the overall structure of a CIS of the image reading apparatus according to the exemplary embodiment.

FIG. 5 illustrates an example of the overall structure of the CIS 11 of the image reading apparatus 1 according to this exemplary embodiment. In FIG. 5, the main scanning direction is orthogonal to the surface of a document.

As illustrated in FIG. 5, the CIS 11 is disposed below the platen glass 12 (see FIG. 4) of the image reading apparatus 1, and includes light guides 112 that guide light from light sources 111 to a document, and a light receiving substrate 113 including light receiving elements 113a that receive the light reflected by the document. The light sources 111 and the light guides 112 are disposed to emit light in one direction toward the document and in another direction toward the document. The light receiving substrate 113 is disposed farther away from the platen glass 12 than are the light guides 112. In the light receiving substrate 113, the light receiving elements 113a are arrayed in line with intervals in the main scanning direction.

The CIS 11 includes a microlens array 114 serving as lenses, and a light shielding wall 115 serving as light shields that block the reflected light to enter the microlens array 114. The CIS 11 further includes a housing 116 that holds the light guides 112, the light receiving substrate 113, the microlens array 114, and the light shielding wall 115. The housing 116 positions the light receiving substrate 113, the microlens array 114, and the light shielding wall 115 relative to the platen glass 12.

Figure 6:
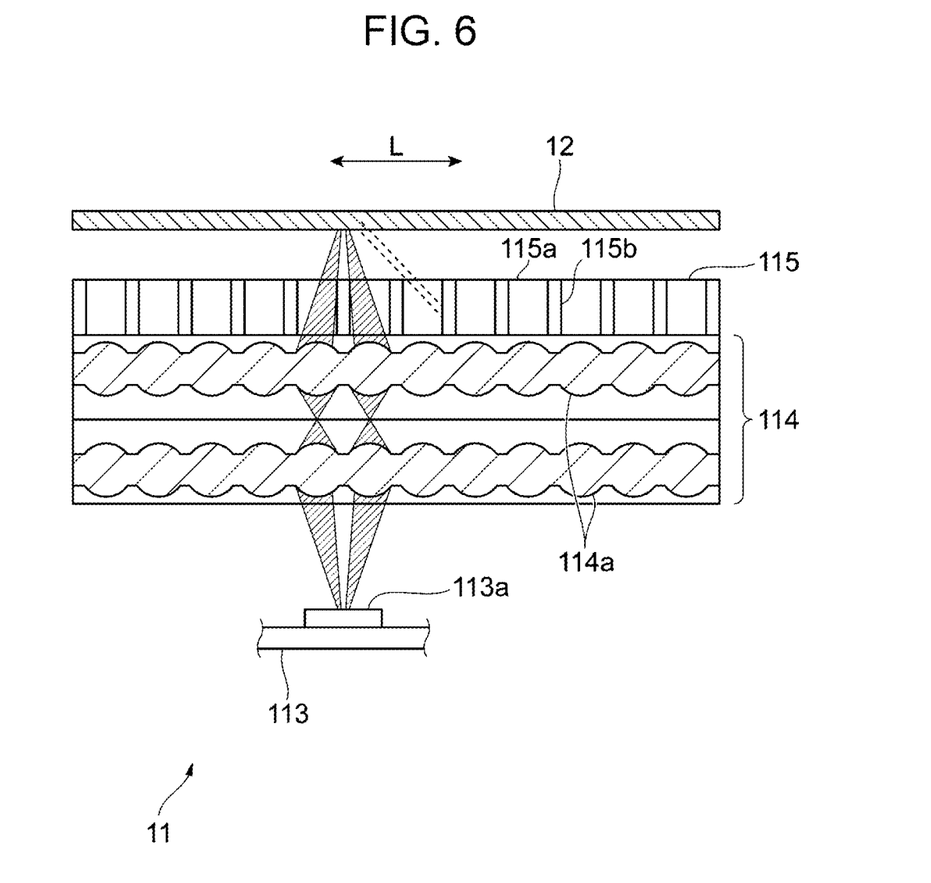
FIG. 6 illustrates an example of how light receiving elements of a light receiving substrate receive light reflected by a document on a platen glass.

FIG. 6 illustrates an example of how the light receiving elements 113a of the light receiving substrate 113 receive the light reflected by the document on the platen glass 12. FIG. 6 illustrates a cross section perpendicular to the drawing sheet of FIG. 5. FIG. 6 illustrates a main scanning direction L.

As illustrated in FIG. 6, the microlens array 114 includes a plurality of microlenses 114a. In the microlens array 114, the microlenses 114a are arrayed lengthwise in the main scanning direction with their optical axes aligned along each other. Examples of the microlens array 114 include an equal-magnification erect imaging double-lens array with less variation in magnification due to misalignment.

In the light shielding wall 115, light transmitters 115a that allow light to pass therethrough and the light shields 115b serving as walls that are disposed along the optical axis direction of light and block light are provided alternately and successively in the main scanning direction L. For example, the light transmitter 115a is made of transparent glass or resin. For example, the light shield 115b is made of a light shielding film or a black adhesive. The light shielding wall 115 is disposed between the platen glass 12 and the microlens array 114 for the large focal depth.

Since the light shielding wall 115 is disposed on the light entrance side of the microlenses 114a, the light shielding wall 115 limits the light that enters the microlenses 114a by blocking the light. Specifically, the light shielding wall 115 makes a gentle incident angle of the light that enters the microlens 14a. With the gentle incident angle of the light, the light path changes gently by refraction at the microlens 114a. As a result, divergence of light near the focus decreases and therefore the focal depth increases.

With the above structure of the CIS 11, the light reflected by the document on the platen glass 12 and passing through the light transmitters 115a of the light shielding wall 115 is received by the light receiving elements 113a through the microlens array 114. With the light shielding wall 115, the aperture angle decreases to narrow the aperture. Further, obliquely incident light is limited and stray light (indicated by broken lines) is prevented from entering the adjacent microlens 114a.

Figure 7A:
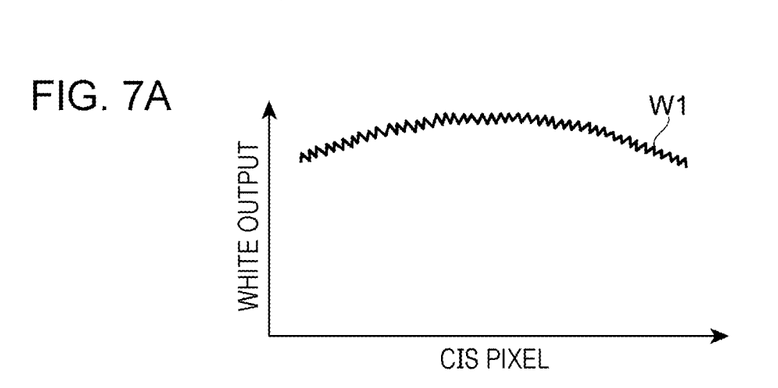
FIG. 7A is a graph illustrating white output values of shading data acquired from a white correction plate at a predetermined timing before the start of document reading.

FIG. 7A is a graph illustrating white output values of the shading data acquired from the white correction plate 14 at the predetermined timing before the start of the document reading.

Shading data W1 acquired from the white correction plate 14 by the CIS 11 at the predetermined timing before the start of the document reading is flat data as illustrated in FIG. 7A.

Figure 7B:
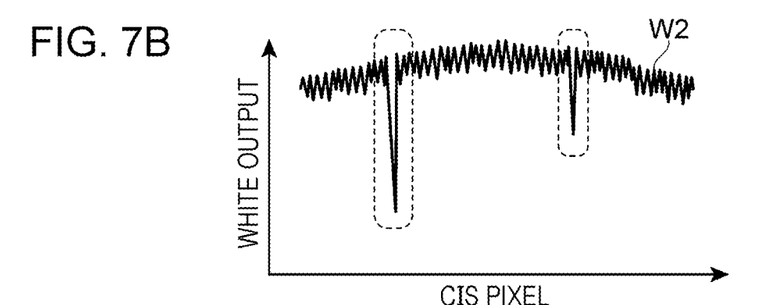
FIG. 7B is a graph illustrating white output values of shading data acquired from a white member at a predetermined timing after the start of the document reading.

FIG. 7B is a graph illustrating white output values of the shading data acquired from the white member 131 at the predetermined timing after the start of the document reading.

For example, soil indicated by broken lines in FIG. 7B may be detected in shading data W2 acquired from the white member 131 every time the CIS 11 has read 10 documents. Therefore, the shading correction includes a process of replacing data detected as the soil in the shading data W2 by using the shading data W1 acquired and saved in advance.

Figure 7C:
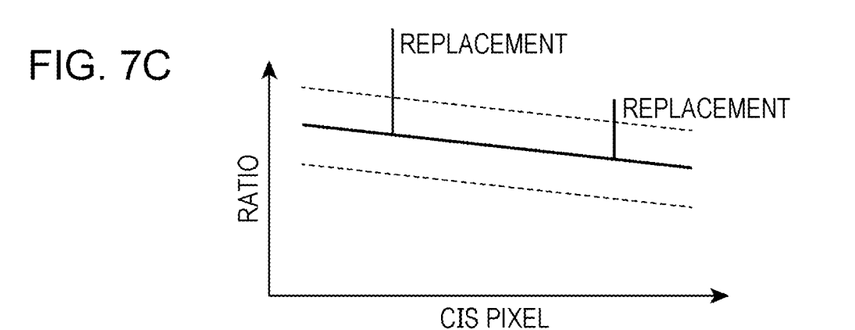
FIG. 7C illustrates a ratio between the shading data acquired from the white correction plate at the predetermined timing before the start of the document reading and the shading data acquired from the white member at the predetermined timing after the start of the document reading.
Figure 7D:
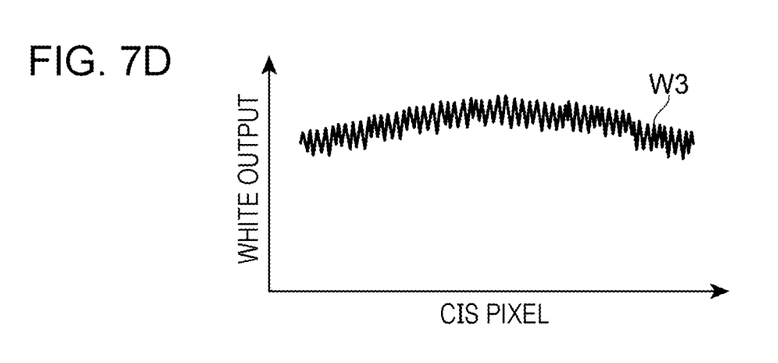
FIG. 7D is a graph illustrating white output values of synthetic shading data obtained from the shading data acquired from the white correction plate at the predetermined timing before the start of the document reading and the shading data acquired from the white member at the predetermined timing after the start of the document reading.

Specifically, in a graph of FIG. 7C illustrating a ratio between the shading data W1 and the shading data W2, a process of replacing data indicating abnormal values is performed. Through the replacement process, synthetic shading data W3 is generated from the shading data W1 and the shading data W2 as illustrated in FIG. 7D. In the next shading correction, the shading data W3 is used for replacement.

Other Exemplary Embodiments

Although the exemplary embodiment has been described above, the exemplary embodiment of the present disclosure is not limited to the exemplary embodiment described above. For example, the structures of the image reading apparatus 1 and the CIS 11 illustrated in FIGS. 4, 5, and 6 are exemplary structures and not particularly limited. The structures are not limited to those in the example described above as long as the functions described above are provided to the image reading apparatus 1 and the CIS 11.

In the exemplary embodiment described above, the shading correction to be performed at the predetermined timing after the start of the document reading is performed once every time the CIS 11 has read 10 documents, but the shading correction is not limited thereto. For example, the time when the document reading is performed by the CIS 11 may be measured and the shading correction may be performed when a predetermined period has elapsed. For example, the shading correction may automatically be performed in response to detection of soil in the output image by the CIS 11.

In the light shielding wall 115 of the CIS 11 illustrated in FIG. 6, the light transmitters 115*a* that allow light to pass therethrough and the light shields 115*b* that block light are formed alternately and successively in the main scanning direction L, but the light shielding wall 115 is not limited thereto. For example, the light shielding wall 115 may be a tubular wall extending in the optical axis direction of light.

In the exemplary embodiment described above, the shading data W1 to be acquired in the shading correction performed before the start of the document reading is acquired by the CIS 11 moving to the position where the white correction plate 14 is disposed, but the shading data W1 is not limited thereto. For example, both the shading data W1 to be acquired in the shading correction performed before the start of the document reading and the shading data W2 to be acquired in the shading correction performed after the start of the document reading may be acquired from the white member 131. In this case, the CIS 11 need not move in the shading correction.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

APPENDIX (((1)))
An optical apparatus comprising:
a reader having a contact optical system comprising an image sensor configured to read light condensed by lenses after passing along light shields each disposed between the lenses; and
a fixed member fixed to a position where the fixed member faces the reader and partially or entirely having a white part,
wherein the reader is configured to perform reading by adjusting a focus onto an image on a document passing across a position closer to the reader than is the fixed member, and perform reading by adjusting the focus onto the white part of the fixed member.

(((2)))
The optical apparatus according to (((1))), wherein the reader is configured to read the white part without changing a positional relationship between the reader and the fixed member.

(((3)))
The optical apparatus according to (((1))) or (((2))),
wherein the reader is configured to read the white part at predetermined timings, and
wherein the optical apparatus further comprises a corrector configured to perform shading correction using, as shading data, information obtained by reading the white part by the reader.

(((4)))
The optical apparatus according to (((2))) or (((3))), wherein the light shields of the reader are walls disposed along an optical axis direction of the light and configured to block the light.

(((5)))
The optical apparatus according to (((3))), wherein a second timing onwards out of the predetermined timings is determined based on at least one of the number of the documents read by the reader or a time when the document has been read by the reader.

(((6)))
The optical apparatus according to (((1))), further comprising a document feeding controller configured to perform control to change a document feeding speed when the reader reads the white part.

(((7)))
The optical apparatus according to (((6))), wherein the document feeding controller is configured to perform control to reduce the document feeding speed as the control to change the document feeding speed.

What is claimed is:

1. An optical apparatus comprising:
a reader having a contact optical system comprising an image sensor configured to read light condensed by lenses after passing along light shields each disposed between the lenses; and
a fixed member fixed to a position where the fixed member faces the reader and partially or entirely having a white part,
wherein the reader is configured to perform reading by adjusting a focus onto an image on a document passing across a position closer to the reader than is the fixed member, and perform reading by adjusting the focus onto the white part of the fixed member.

2. The optical apparatus according to claim 1, wherein the reader is configured to read the white part without changing a positional relationship between the reader and the fixed member.

3. The optical apparatus according to claim 2,
wherein the reader is configured to read the white part at predetermined timings, and
wherein the optical apparatus further comprises a corrector configured to perform shading correction using, as shading data, information obtained by reading the white part by the reader.

4. The optical apparatus according to claim 3, wherein the light shields of the reader are walls disposed along an optical axis direction of the light and configured to block the light.

5. The optical apparatus according to claim 3, wherein a second timing onwards out of the predetermined timings is determined based on at least one of the number of the documents read by the reader or a time when the document has been read by the reader.

6. The optical apparatus according to claim 1, further comprising a document feeding controller configured to perform control to change a document feeding speed when the reader reads the white part.

7. The optical apparatus according to claim 6, wherein the document feeding controller is configured to perform control to reduce the document feeding speed as the control to change the document feeding speed.

8. An optical apparatus comprising:
reading means having a contact optical system comprising image detection means for reading light condensed by lenses after passing along light shields each disposed between the lenses; and a fixed member fixed to a position where the fixed member faces the reading means and partially or entirely having a white part,
wherein the reading means is configured to perform reading by adjusting a focus onto an image on a document passing across a position closer to the reading means than is the fixed member, and perform reading by adjusting the focus onto the white part of the fixed member.

\* \* \* \* \*